Jan. 5, 1965  D. D. THEOBALD  3,164,708
PRECIOUS METAL TIP FOR STROWGER SWITCH WIPERS
Filed Oct. 27, 1960
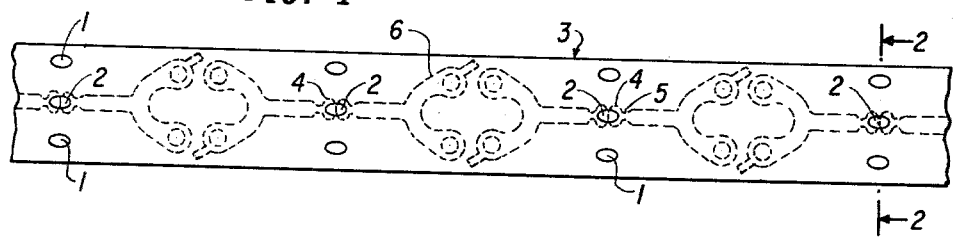
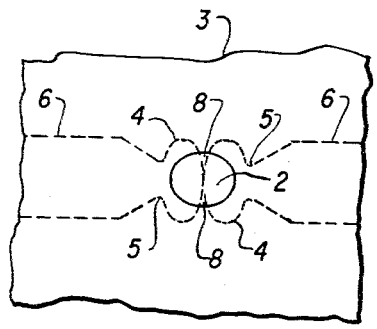
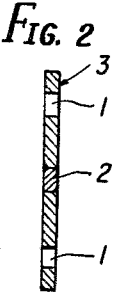
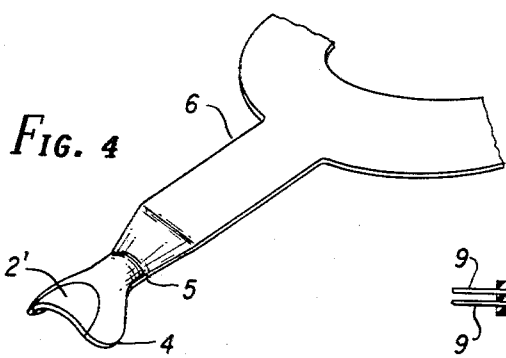
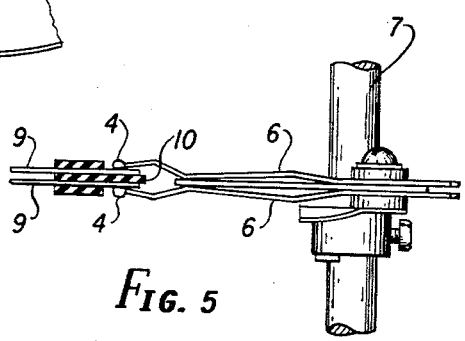
INVENTOR.
Dale D. Theobald
BY
Atty.

United States Patent Office

3,164,708
Patented Jan. 5, 1965

3,164,708
PRECIOUS METAL TIP FOR STROWGER SWITCH
WIPERS
Dale D. Theobald, Berkeley, Ill., assignor to Automatic Electric Laboratories, Inc., Northlake, Ill., a corporation of Delaware
Filed Oct. 27, 1960, Ser. No. 65,538
1 Claim. (Cl. 200—166)

This invention relates to electrical contacts, and more particularly to contact wiper springs used in switch mechanisms such as telephone switches.

In certain types of telephone switching apparatus wipers may be required to travel over a multiplicity of terminals before arriving at the one with which electrical contact is desired, and when the wiper arrives at the proper terminal it is essential that an intimate, low resistance contact be established, particularly when the contact is in a circuit carrying talking current.

One way of obtaining such a contact is to make the terminal and the wiper both of a precious metal. This, however, is expensive and furthermore may not be entirely satisfactory because of the fact that the wiper and terminal must not only be made of suitable contact material, but they must also be held in contact with suitable mechanical pressure. Good contact materials do not in general have good spring characteristics. It is therefore desirable in such apparatus to make the wiper of a base metal that is inexpensive and which has suitable mechanical characteristics, and to make the contact portion thereof of precious metal.

Several ways have been proposed for accomplishing this result. One is to plate the contact carrying portion of the base metal member with precious metal. Another method that has been considered involves welding a small bar of contact material to the base metal tip, but such constructions are open to objections from the manufacturing standpoint as well as others.

Another method of employing precious metal for contact material has been disclosed in Patent 2,373,861 April 17, 1945 to C. L. Van Inwagen, Jr. In that disclosure, inserts of a precious metal are welded at intervals in apertures in a base metal strip and the strips are then cold rolled. The inserts are of sufficient size such that when the wipers are punched from the strip in pairs, the tip or head of each wiper is virtually all precious metal. Furthermore, a considerable amount of precious metal is lost as scrap on both sides and externally of the wiper tips.

An object of the present invention is to provide a novel method of making contact wiper springs which virtually eliminates the loss of precious metal.

Another object of this invention is to provide a wiper having a precious metal insert which greatly increases the life of the wiper and yet involves only a minimum of expense for the precious metal.

A feature of this invention consists in confining the precious metal substantially to the contact wear area of the wiper tip. In this connection it should be remembered that the tip of a conventional wiper is formed with a depressed front center portion so that initially there is almost a point contact between the wiper tip and the stationary contact engaged thereby. However, after a period of operation, a flattened area may be observed at the wiper tip which is of an arcuate shape and extends rearwardly into the wiper tip from the front edge thereof. This flattened area is herein referred to as the area or pattern of contact wear.

In the embodiment disclosed herein which may be regarded as an improvement over the above-mentioned Van Inwagen disclosure, the wipers are laid out on the base metal strip in pairs, with their contacting tips abutting on a precious metal insert of a size and shape such that the insert does not extend into the neck portion of the wipers and also does not extend beyond the lateral edges of the wiper tip. The precious metal insert, if originally of circular shape, becomes somewhat elongated or oval lengthwise of the strip due to the rolling operation and when punched out, each wiper receives approximately half of this insert. The location and configuration of the precious metal insert is chosen so that this semi-oval, or at any rate arcuate, area of precious metal corresponds substantially to the aforementioned area of contact wear of the wiper tip. In order to facilitate the proper orientation of the precious metal inserts with respect to the wiper tips, the wiper pairs are preferably laid out on the base metal strip so that the center line of the wiper pairs are parallel to the longitudinal edges of the strip. This method has the further advantage that the longitudinal grain of the rolled strip is oriented lengthwise of the wiper, whereby the spring action of the wiper is improved.

The present invention has been illustrated in the accompanying drawings in which:

FIG. 1 shows a base metal strip with precious metal insert welded in apertures in a row and along the center line of the strip after the strip has been rolled to the proper thickness.

FIG. 2 shows a cross section taken on line 2—2 of FIG. 1.

FIG. 3 is a cut-away of the abutting wiper tips on the base metal strip, enlarged to show the relation of the precious metal insert to the wiper tips.

FIG. 4 is an enlarged perspective view of a wiper of conventional configuration showing the size and shape of the precious metal insert.

FIG. 5 shows a wiper assembly on a shaft associated with terminals of a switch bank.

Referring now to the drawings, FIGURES 1 and 2 show the base metal strip 3 after rolling. Wipers 6 are laid out in pairs with their center line parallel to the longitudinal edges of the strip and their contacting tips 4 abutting on one of the precious metal inserts 2. The holes 1 are guide holes to locate the strip as it passes through the punch press.

As more clearly shown in FIGURE 3, the billet 2 is of a generally oval shape after the rolling step and is divided between the tips 4 of the two wipers 6 of the pair so that no portion of the precious metal extends beyond the neck portion 5 of either wiper and also does not extend beyond the lateral edges of the wiper tips. Thus the precious metal is fully confined within the wiper tips or heads 4, with the possible exception of two minute wedges 8 if—as in the embodiment shown—the front edges of the wiper tips are of other than rectilinear shape.

FIGURE 4 shows the finished wiper as it emerges from the punching and forming operation. As will be noted from this figure, the wiper head 4 is formed with a depressed center portion and two raised side or "wing" portions so that, in operation, smooth wiping action between the wiper tips and the cooperating row of stationary contacts is insured. The precious metal insert 2' is shown covering a generally semi-oval area which does not extend beyond the neck portion 5 of the wiper. More specifically, the insert has an arcuate rear outline subtended by the front edge of the head so that the insert lies completely within the confines of wiper head 4. The area thus covered by the insert 2' is the contact wear area, as defined above, of the wiper head 4.

FIGURE 5 is a wiper assembly composed of a pair of wipers 6 on a shaft 7 engaging the contact terminals 9 on opposite sides of an insulation sheet 10 in a conventional switch bank. The way in which the wipers engage the bank contacts is clearly shown in this figure. This method of engagement results in the pattern of wear explained above.

Wipers of the present invention may be punched from the base metal strip with the punches in any suitable arrangement; for example, there may be two punches along-side of each other for punching out the two wipers simultaneously, or a gang of punches may be arranged side by side to progressively punch out the wipers. It is immaterial how this punching is done as long as the tips of the wipers are located on succeeding precious metal billets such that the resulting wipers have precious metal inserts completely within the head of each wiper tip. In this manner, the loss of precious metal in the scrap is minimized.

While a particular form of wiper has been shown suitable for use in switching apparatus of the telephone art, it is to be understood that the invention is not restricted in scope to the embodiment disclosed herein, and that modifications may be made within the scope indicated by the appended claim without departing from the spirit or sacrificing any of the advantages of this invention.

What is claimed is:

A wiper spring for use in a switch in which the wiper spring moves over stationary contacts to make contact therewith, said spring punched from a base metal strip having a precious metal insert therein, said spring formed so as to have a narrow neck portion connecting a relatively wide head portion to the main body of the spring, said head portion having a depressed center portion at the point where it engages the stationary contacts, said head portion having the precious metal insert entirely included therein with its front curved edge coinciding with the front edge of the head portion and having a curved rear edge extending back or a short distance from said front edge and entirely surrounded by a section of the base metal head, said precious metal insert providing the contact making surface and the remainder of the head and neck being formed of base metal to provide the proper resiliency for the spring.

References Cited in the file of this patent
UNITED STATES PATENTS

| | | |
|---|---|---|
| 2,373,861 | Van Inwagen | Apr. 17, 1945 |
| 2,646,613 | Enzler | July 28, 1953 |
| 2,699,597 | Arms | Jan. 18, 1955 |
| 2,773,964 | Majkrzak | Dec. 11, 1956 |
| 2,814,700 | Culkoskz | Nov. 26, 1957 |
| 2,937,434 | Swift | May 24, 1960 |